Patented Dec. 9, 1924.

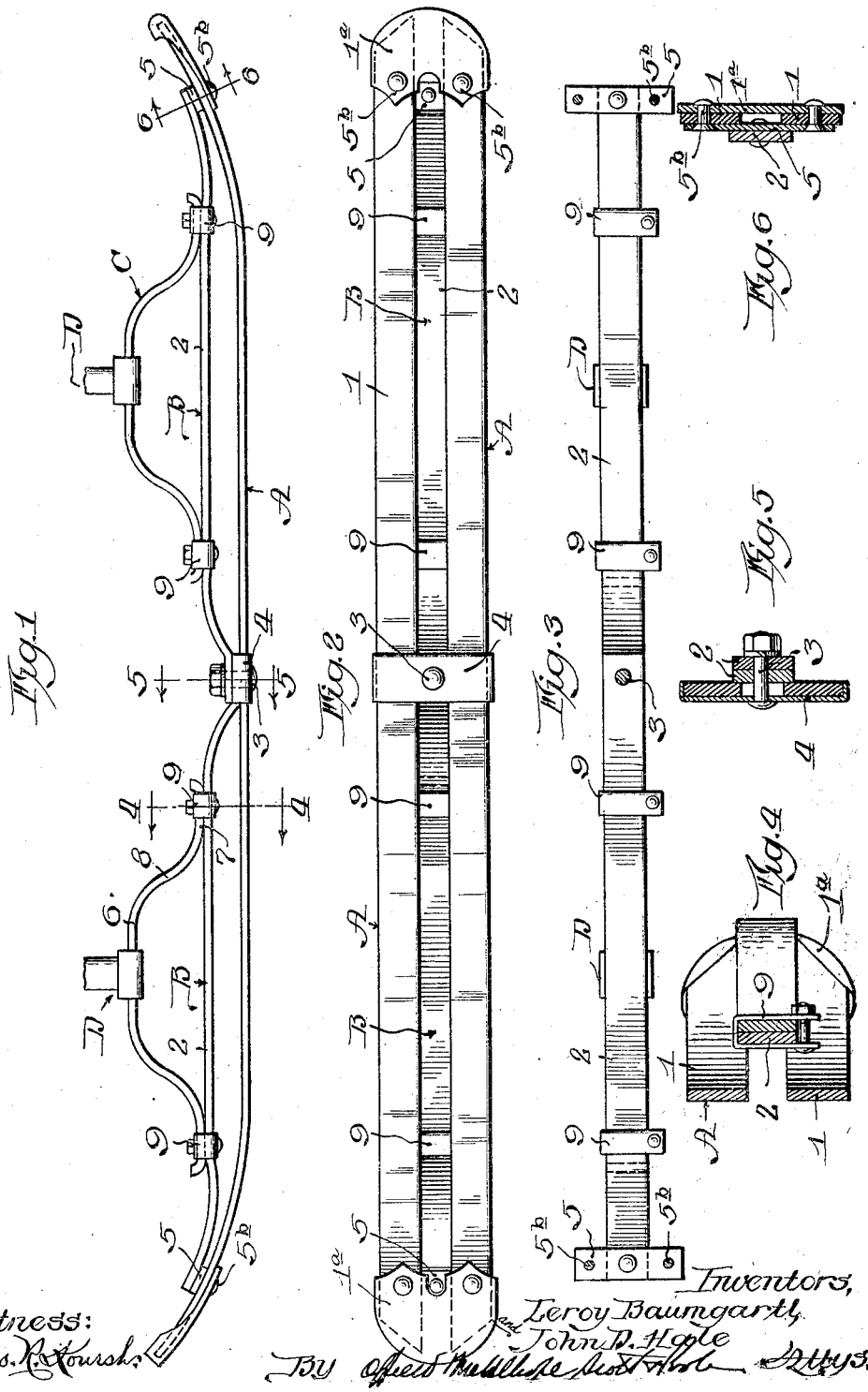

1,518,381

UNITED STATES PATENT OFFICE.

LEROY BAUMGARTL AND JOHN D. HALE, OF CHICAGO, ILLINOIS, ASSIGNORS TO RAM-SPRING BUMPER COMPANY, OF CHICAGO, ILLINOIS, A CORPORATION OF ILLINOIS.

AUTOMOBILE BUMPER.

Application filed July 2, 1924. Serial No. 723,660.

*To all whom it may concern:*

Be it known that we, LEROY BAUMGARTL and JOHN D. HALE, citizens of the United States of America, and residents of Chicago, Cook County, Illinois, have invented a certain new and useful Improvement in Automobile Bumpers, of which the following is a specification.

This invention relates to improvements in automobile bumpers and more particularly to bumpers constructed of bars of spring steel and designed to resist the shock of collision impacts by the resilient character of the bumper structure.

The object of the invention is to provide an improved construction for bumpers of the character described and embodying certain novel features of design calculated to increase the strength and impact resisting qualities of the bumper, without increasing the weight of material used.

A preferred embodiment of the invention is disclosed in the accompanying drawings in which:

Figure 1 is a top plan view of the bumper;

Figure 2 is a view in front elevation of the bumper;

Figure 3 is a view in front elevation of the rear bar of the bumper, as it appears with the impact member removed;

Figure 4 is a detail view in cross-section taken on line 4, 4, of Figure 1.

Figure 5 is a detail view in cross-section taken on line 5, 5, of Figure 1, and

Figure 6 is a detail view in cross-section taken on line 6, 6, of Figure 1.

The bumper is made up almost entirely of flat bars of spring steel with their flat sides arranged vertically so as to yield horizontally, but to be relatively non-yieldable in a vertical direction. Considering the main parts of the bumper, the same comprises a front impact member A, a section rear or reinforcing bar B and two U-shaped spring bars C, C, clamped at their ends to each section of the reinforcing bar B, and having direct connection with brackets D, D, of suitable design for supporting the bumper on the ends of the frame members of the automobile.

The impact member A is a rigid frame consisting of two parallel bars 1, 1, spaced apart vertically, throughout their lengths and their ends connected by ornamental plates riveted to the bars, and flanged at their outer rounded edges to cover the extremities of the bars and form smooth extremities. Moreover, the end portions of the impact member are curved rearwardly as clearly shown in Figure 1.

The rear bar B is disposed immediately behind the impact member, its relative position being more accurately described as directly behind the space or slot separating the bars 1, 1, of the impact member A. This rear bar is preferably in two sections, each consisting of a single bar 2 occupying corresponding positions on opposite sides of the central point of the bumper. Moreover, each bar 2 is a counterpart of the other, being straight throughout the greater part of their lengths, and bent forwardly at their inner and adjacent ends to form overlapping ends meeting at the center of the impact member. These ends are secured together and to the impact member A by a bolt 3, passing through the overlapping ends of the bars and an anchor plate 4, extending crosswise against the front face of the impact member and having its ends bent rearwardly to embrace the top and bottom edges thereof. The outer end portions of the bars 2, 2, are curved slightly to conform to the curvatures at the ends of the impact member. The over-all length of the rear bars 2, 2, is slightly less than the impact member, their outer ends being joined to the latter, a short distance inwardly from each end. A strap 5 (Figure 6) is employed as an intermediate connecting member between the ends of the reinforcing bar B and the impact member A. This strap extends transversely of the impact member, and has its ends riveted flatwise against the rear faces of the bars 1, 1, the ends of the bars 2 being riveted to the intermediate portion. The rivets 5[b] which connect the ends of the strap 5 to the bars 1, 1, also serve to secure the end plates 1[a] to the front faces of the same bars.

The rear spring bars C, C, consist of two shorter bars bent in the form of flat U-shaped springs, shaped to form a rearwardly disposed straight central portion 6, and forward end portions 7, 7, with reversed or S-curved portions 8, 8, therebetween. To the central portion 6 of each bar C is clamped an attaching bracket D, while its end portions 8, 8, are clamped in flatwise contact to the rear face of each of the bars 2 of the reinforcing member B, by means of clamps 9, 9. The points of connecting of these spring bars are near the ends of each of the bars 2, 2, thus distributing the points of support of the bumper at four points spaced at substantially equal intervals throughout the length of the bumper while the ultimate points of attachment to the vehicle are intermediate each pair of clamps connecting the spring bars C, C, to the main portions of the bumper. For security the ends of the spring bars are upset to prevent the bars from being pulled through the clamps, and to otherwise limit the sliding movement of the bars in the clamps.

In the event of collision the entire structure yields with the impact, each portion or bar being distorted in proportion to its proximity to the point of impact, either to absorb directly or equalize the force directed against a portion more directly in the line of impact. Manifestly, the impact member receives the blow, and resists it by its own resiliency as well as the yielding distortion of the bars 2, 2. Similarly, the spring bars C, C, tend to flatten as they yieldingly resist the impact, being free to elongate by the slidings of the ends 8, 8, in the clamp 9 and along the rear bars 2, 2.

In this manner, the force of the impact is distributed throughout the entire structure, and successively absorbed or cushioned as it is transmitted from front to rear, with the result that but a comparatively small proportion of the initial impact is transmitted to the vehicle frame, depending, of course, on the severity of the collision since manifestly there is a limit to the force which any bumper can withstand.

Having set forth the features of our invention, we claim:

1. An automobile bumper comprising an impact member extending the length of the bumper, a rearwardly disposed reinforcing bar, rigidly secured adjacent the ends and central portion of said impact member and spring bars bent in U-shape, and secured at their ends to said reinforcing bars on opposite sides of its point of connection with said impact member, and adapted for attachment, intermediate their ends to the automobile.

2. An automobile bumper comprising an impact member consisting of parallel bars spaced apart, vertically and joined together at their ends, a single reinforcing bar immediately behind said impact member and connected thereto at its ends and center, and a pair of U-shaped spring bars clamped at their ends to said reinforcing bar on either sides of its central point of connection with said impact member.

3. An automobile bumper comprising an impact member, extending throughout the length of the bumper, a reinforcing member, consisting of bars secured to the central portion of the impact member and extending parallel therewith on either side of said central portion and secured at their outer ends adjacent the ends of said impact member and a pair of spring bars clamped at their ends to the bars of said reinforcing member and having rearwardly disposed portions adapted for attachment to the frame of an automobile.

4. An automobile bumper comprising an impact member extending the length of the bumper, a reinforcing member consisting of a pair of bars, connected together and to the impact member, midway the ends of the bumper, their outer ends being rigidly connected with the impact member and a pair of relatively flat U-shaped spring bars clamped at their ends to said reinforcing bars, for sliding contact therewith and adapted to have attaching brackets secured intermediate their ends.

5. An automobile bumper comprising an impact member consisting of parallel bars spaced apart vertically and joined at their ends, a reinforcing member consisting of single bars spaced rearwardly of the space between the bars of said impact member, said bars overlapping at their adjacent ends and rigidly connected to the central portion of the impact member and connected at their outer ends at points disposed inwardly from the end of said impact member and U-shaped spring bars, clamped in sliding contact at their ends to said reinforcing bars and adapted for attachment intermediate their ends to an automobile.

6. An automobile bumper comprising an impact member of resilient bars extending the length of the bumper, a pair of resilient reinforcing bars connected at the center and ends of said impact member, and a spring bar clamped at its ends to each reinforcing bar, and having a rearwardly disposed central portion adapted for attachment with an automobile.

7. An automobile bumper comprising an impact member of resilient bars extending the length of the bumper, a pair of resilient reinforcing bars, connected at the center and ends of said impact member and a pair of elongated U-shaped bars having end portions clamped flatwise to said reinforcing bars and having rearwardly offset intermediate portions and brackets clamped to said intermediate portions.

Signed at Chicago this 24th day of June 1924.

LEROY BAUMGARTL.
JOHN D. HALE.